(12) United States Patent
Candy (10) Patent No.: US 11,454,736 B2
(45) Date of Patent: Sep. 27, 2022

(54) METAL DETECTOR (71) Applicant: Minelab Electronics Pty. Limited, Mawson Lakes (AU)

(72) Inventor: Bruce Halcro Candy, Mawson Lakes (AU)

(73) Assignee: Minelab Electronics Pty. Limited, South Australia (AU)

( * ) Notice: Subject to any disclaimer, the term of this patent is extended or adjusted under 35 U.S.C. 154(b) by 0 days.

(21) Appl. No.: 17/012,278

(22) Filed: Sep. 4, 2020

(65) Prior Publication Data

US 2021/0072417 A1 Mar. 11, 2021

(30) Foreign Application Priority Data

Sep. 5, 2019 (AU) ................................ 2019903282

(51) Int. Cl.
*G01V 3/10* (2006.01)
*G01V 3/165* (2006.01)

(52) U.S. Cl.
CPC .............. *G01V 3/101* (2013.01); *G01V 3/165* (2013.01)

(58) Field of Classification Search
CPC .......... G01V 3/15; G01V 3/107; G01V 3/104; G01V 3/105; G01V 3/12; G01V 3/101; G01V 3/165
See application file for complete search history.

(56) References Cited

U.S. PATENT DOCUMENTS

| | | | |
|---|---|---|---|
| 3,471,773 A * | 10/1969 | Penland | ................... G01V 3/15 324/329 |
| 3,662,255 A | 5/1972 | Garrett | |
| 4,507,612 A * | 3/1985 | Payne | ................... G01V 3/105 324/233 |
| 7,518,374 B1 | 4/2009 | Olsson et al. | |
| 7,994,789 B1 | 8/2011 | Geyer | |
| 8,106,770 B2 | 1/2012 | Candy | |
| 8,400,154 B1 | 3/2013 | Olsson et al. | |
| 8,614,576 B2 | 12/2013 | Candy | |
| 9,348,053 B2 | 5/2016 | Candy | |
| 9,547,065 B2 | 1/2017 | Candy | |
| 9,829,598 B2 | 11/2017 | Candy | |
| 2005/0116714 A1 | 6/2005 | Rudakov et al. | |
| 2010/0174348 A1 | 7/2010 | Bulkes et al. | |
| 2014/0097831 A1 | 4/2014 | Whaley | |

(Continued)

OTHER PUBLICATIONS

Dunlop et al., "Rock Magnetism, Fundamentals and Frontiers", Cambridge: Cambridge University Press, 1997, Chapter 10, Viscous and thermoviscous magnetization, pp. 262-287.

*Primary Examiner* — Jermele M Hollington
*Assistant Examiner* — Suresh K Rajaputra
(74) *Attorney, Agent, or Firm* — The Webb Law Firm (57) ABSTRACT

A metal detector for detecting a target, the metal detector including: a transmitter for transmitting a transmitted magnetic field; a receiver, including a winding with a plurality of turns, for receiving a magnetic field; and a receive electronics connected to the winding for receiving signals from the winding. The receiver further includes an electrostatic screen covering at least part of the winding. The electrostatic screen is connected to an electronic circuit to receive signals from the receiver to reduce an effective capacitance presented by the electrostatic screen to the winding.

14 Claims, 7 Drawing Sheets

(56) References Cited

U.S. PATENT DOCUMENTS

| | | | |
|---|---|---|---|
| 2016/0146857 A1* | 5/2016 | Behrends | G01R 15/183 |
| | | | 324/127 |
| 2018/0106925 A1 | 4/2018 | Candy | |
| 2018/0172869 A1 | 6/2018 | Candy | |
| 2020/0161046 A1 | 5/2020 | Goodman | |
| 2021/0072418 A1* | 3/2021 | Candy | G01V 3/165 |

* cited by examiner

METAL DETECTOR

CROSS-REFERENCE TO RELATED APPLICATION

This application claims priority to Australian Provisional Patent Application No. 2019903282 filed Sep. 5, 2019, the disclosure of which is hereby incorporated by reference in its entirety.

TECHNICAL FIELD

The present invention relates to a metal detector.

BACKGROUND

The general forms of most metal detectors which interrogate soil are either handheld battery operated units, conveyor-mounted units, or vehicle-mounted units. Examples of handheld products include detectors used to locate gold, explosive land mines or ordnance, coins and treasure. Examples of conveyor-mounted units include safety detection of metal in food production lines and detection of metal in mining ores before entering crushers, and examples of a vehicle-mounted unit include detectors to locate buried land mines.

These metal detectors usually, but not necessarily, consist of transmit electronics generating a repeating transmitted signal cycle of a fundamental period, which is applied to an inductor, for example a transmit winding, which transmits a resulting varying magnetic field, sometimes referred to as a transmitted magnetic field.

These metal detectors may also contain receive electronics that process a received signal from a receiver/antenna that measures a received magnetic field, during one or more receive periods during the repeating transmitted signal cycle, to produce an indicator output signal, the indicator output signal at least indicating the presence of at least a metal target within the influence of the transmitted magnetic field. The receive antenna is usually also an inductive winding, and in some metal detectors, the receive inductive winding and transmit inductive winding are one and the same.

During the processing of measuring the received magnetic field, the receive signal is either sampled, or synchronously demodulated, to produce one or more signals to produce the indicator output signal.

SUMMARY

According to a first aspect of the present disclosure, there is provided a metal detector for detecting a target, the metal detector comprising: a transmitter for transmitting a transmitted magnetic field; a receiver, comprising a winding with a plurality of turns, for receiving a magnetic field; and a receive electronics connected to the winding for receiving signals from the winding; wherein the receiver further comprises an electrostatic screen covering at least part of the winding; and wherein the electrostatic screen is connected to an electronic circuit to receive signals from the receiver to reduce an effective capacitance presented by the electrostatic screen to the winding.

In one form, the electronic circuit is connected to the receive electronics. In one form, the signals from the electronic circuit to the electrostatic screen are dependent on the receiving signals from the winding. In one form, the electronic circuit introduces a phase shift to the signals from the winding and sends the phase-shifted signals to the electrostatic screen. In one form, the electronic circuit comprises a filter which has a phase shift of between 60 to 120 degrees at a second-order internal resonance frequency of the winding. In one form, the electronic circuit comprises a filter, the filter comprises a low-pass filter of a second-order transfer function, or higher-order transfer function, with a cut-off frequency within at least 40% of a second-order internal resonance frequency of the winding. In one form, a Q factor of the second-order transfer function is between 1 and 2. In one form, the receive electronics is connected to a first tap of the winding in addition to being connected to both ends of the winding. In one form, the first tap is at a mid-point of the winding.

In one form, the receive electronics reduces a Q factor of the second-order internal resonance of the winding. In one form, the receive electronics reduces a decay time of a transmitted signal within the winding. In one form, the transmitter and the receiver are the same single winding. In one form, the electronic circuit is implemented digitally.

According to a second aspect of the present disclosure, there is provided an antenna for a metal detector, including: at least a winding, the winding comprises a plurality of turns connected to receive electronics of the metal detector; and an electrostatic screen covering at least part of the winding; wherein the electrostatic screen is connected to an electronic circuit of the metal detector to receive a signal from the antenna to reduce an effective capacitance presented by the electrostatic screen to the winding.

In one form, the electronic circuit is connected to the receive electronics of the metal detector.

BRIEF DESCRIPTION OF DRAWINGS

Embodiments of the present invention will be discussed with reference to the accompanying drawings wherein.

DESCRIPTION OF EMBODIMENTS

In this specification, new designs for a metal detector are presented. This applies to mainly time-domain metal detectors, such as for example, for a metal detector where its transmitted waveform is pulse induction (PI), or, PI-like waveforms, and wherein the mode of operation may include both separate transmit and receive periods or simultaneous transmit and receive periods. For ease of explanation, the specification describes that of a PI metal detector as an example, but it does not mean that the embodiments described herein can only be used with a PI metal detector. It applies generally to all time-domain detectors, but also frequency domain detectors.

In this specification, unless otherwise stated, a metal detector antenna typically comprises at least one winding of a multiple-turn conductor, such as single strand copper wire, and/or Litz wire. Generally, a metal detector antenna comprises a housing, an electrostatic screen, the at least one winding, and a cable connected to the winding, usually including at least one coaxial cable. To avoid any ambiguity, a "winding" does not exclude split windings. For example, a so called "DOD" antenna, would be understood to include two outer windings normally connected in series, each outer winding having multiple-turns; whereas a "monoloop" metal detector antenna would be understood to be a single winding of multiple-turns. A magnetic field antenna for a metal detector is commonly known as a coil. Not all metal detector antennas can be said to include a "cable connected to the winding", for example, in some industrial conveyor mounted metal detectors, the winding may be in effect connected directly to a PCB. However, in this specification, it is assumed the winding is connected to a "cable", but this does not limit this invention to require the said cable.

In this specification, unless otherwise stated, a receive winding or windings of a metal detector can be separate from a transmitter winding or windings, or the receive winding or windings and the transmitter winding can be the same single winding or windings.

Time-domain metal detectors usually synchronously demodulate (or sample) a receive signal from a receive antenna winding commencing after a short delay following a voltage transition of a transmitted signal, for example, after the back electromotive force (emf) of a pulse induction (PI) transmitted pulse, or after a switching from a high voltage (e.g. 200V) to a low-voltage (e.g. 5V) or to zero voltage. In most detectors, the minimum for the practical delay is usually limited by the time-decay signal from a critically damped receive winding, wherein the capacitance of any cable or other capacitive loading on the receive winding circuit, such as the screen or electronics, contributes to the said decay. For example, in a PI detector, wherein the receive and transmit winding are one and the same (a so-called "monoloop" winding), the voltage across the winding needs to decay from hundreds of volts down to millivolts to avoid overloading a receive electronics preamplifier connected to it, and thereafter, still continues to decay for some time. Further, this decay-time is altered by the magnetic permeability of interrogated soils due to the effect of altering the inductance of the said antenna inductive winding. If the receive signal synchronous demodulation commences during this decay time period, which as said, may vary when magnetic soils are being interrogated, this will cause corresponding varying undesirable spurious signals. However, there is a conflicting requirement for many metal detectors that are used to seek short time-constant metal targets, namely, these require as early as possible commencement of receive synchronous demodulation, or sampling, post the said voltage transition of a transmitted signal. This is because much of the decaying signal from the faster time-constant targets following a transition of the transmitted signal are by definition, ephemeral, and thus most, or even practically all of this target signal decay is not added into the receive demodulation, and hence contributes relatively poorly to the indicator outputs signal. Examples of short time-constant targets include some minimum metal land mines, small gold nuggets, and fine jewelry. Improving the sensitivity to very short time-constant targets requires reduction of this delay before demodulation, in turn thus requiring reduction of the time-decay of the critically damped receive winding. Hitherto, this was usually achieved by choosing a low inductance for the antenna receive windings, or eliminating the capacitive loading of the receive windings by the capacitance of the connecting cable, through incorporating a receive preamplifier within the antenna housing, but, this can be impractical for commonly used PI monoloop antennas due to the sheer quantity of electronics required locally within the antenna housing.

A means of speeding up the decay effects of unwanted transient signals in a receive winding stimulated by the said transmitted signal voltage transitions is described in U.S. Pat. No. 9,547,065, which discloses reducing the effective equivalent parallel capacitance of a receive winding in a metal detector by means of a quasi-negative-capacitance generator. The introduced negative capacitance in effect decreases the characteristic rate of decay of a critically damped parallel LCR network. However, it was discovered that this method may be enhancing higher order internal resonances of the receive winding, that may have high Q factors. These resonances may manifest as ringing which may extend significantly into a receive synchronous demodulation period. The phase/frequency of these internal resonances are also modulated by magnetic permeability of soil, which may in turn adversely alter demodulated and processed receive signals.

A different means of reducing receive signal decays is described in U.S. Ser. No. 15/848,815 using various methods for an antenna using a separate transmit and receive windings, within the metal detector receive electronics, such as for example, eliminating an $\omega t e^{-\omega t}$ component in the receive winding signal but leaving only a faster decaying $e^{-\omega t}$ component.

Yet further, U.S. Pat. Nos. 9,348,053 and 9,829,598 disclose T/R switches used in PI metal detectors, that rapidly terminate the back emf. However, it was discovered that the rapid transients stimulate the transmit and receive winding's internal higher order resonances. Again, the magnetic soil modulation of the phase/frequencies of these resonances may be undesirable in causing random spurious signals during synchronous demodulation during a receive period.

As best understood, there is not much research in the area of higher order internal resonances of inductive windings, because usually these internal resonances are irrelevant to almost all inductor applications, e.g. switch mode power supplies, and hence, the lack of any need for research in this area. It was discovered that these higher-order internal resonances are caused by inter-winding distributed capacitance and mutual inductance. These resonances are typically about an order of magnitude higher in frequency than the very well-known fundamental "self-resonance" for monolayer winding profiles that include the capacitance of a coaxial cable coil cable connecting the winding to the metal detector electronics, but not necessarily so for glued and/or self-bonded bunched windings, which may be somewhat less than an order of magnitude higher. For example, assuming the fundamental self-resonance of a tightly-wound monolayer winding of 35 cm mean diameter, of 300 µH with about 0.3Ω DC resistance, connected to a typical hand-held metal detector antenna cable, may be roughly about 600 kHz, whereas, the second-order internal resonance may be roughly about 4 MHz. Further, until this disclosure, there is no in-depth research of higher order internal resonances of antenna windings in the field of metal detectors, including sinewave and traditional PI transmitting metal detectors. However, these internal resonances are now discovered to be problematic for reasons already described.

A basic summary of these internal resonances is disclosed herein for reference, because it is not known to those skilled in the art of metal detection. The models used for this are simplified sufficiently for the purpose of understanding.

Figure 1:
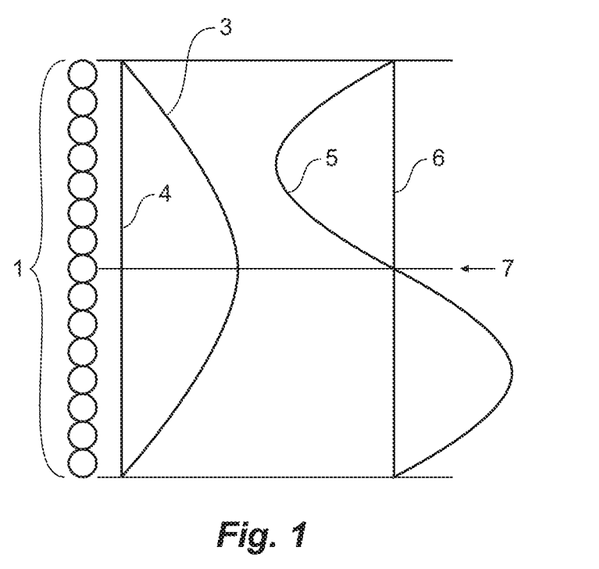
FIG. 1 depicts a cross-section of individual windings of a monolayer antenna to explain an issue of some existing metal detectors.

With reference to FIG. 1, there is provided a cross-section of individual windings of a monolayer winding 1. The approximate corresponding voltage profile of the second order internal resonance across the width of the winding is shown as graph 3, where the graph "zero" is shown as 4. The approximate third-order voltage profile internal resonance across the winding is shown as graph 5 with its "zero" being 6. The centre of the monolayer winding 1 is shown at 7. These voltage profiles assume that the windings are loaded by relatively low impedances at the second and higher internal resonances, for example, the relatively high capacitance of a coaxial cable connecting the winding to the metal detector electronics, or a low impedance output of transmit electronics.

The majority of metal detectors with high sensitivity such as those used to interrogate buried targets in soils, or food safety conveyor mounted metal detectors, use an electrostatic screen to surround one or more receive windings of the antenna. This screen is a relatively poor conductive material connected to the electrical ground of a system. In some instances, for example, this material may be "aquadag", and in others, conductive plastic. The interaction between the windings and these electrostatic screens adds mainly capacitance, usually slightly lossy, to the equivalent fundamental resonant circuit LCR network of the windings.

An aim of this disclosure is to improve the speed of decay transients resulting from transmit winding voltage transitions by connecting the electrostatic screen to a processed receive signal, such that in effect, a signal on the screen partially "bootstraps" a signal of the receive winding to reduce the effective capacitance presented by the electrostatic screen to the said receive winding.

In a broad form, the electrostatic screen is connected to an electronic circuit which provides a signal dependent on the receive signal. In one embodiment, the electrostatic screen is connected to the receive electronics to receive signals from the receive electronics to reduce an effective capacitance presented by the electrostatic screen to the receive winding. In another form, the electrostatic screen is connected to an electronic circuit, separated from the receive electronics, but is able to receive a signal dependent on the receive signal to provide directly or indirectly a same signal or a different signal dependent on the receive signal to the electrostatic screen.

The electrostatic screen can take many forms. In one form, it is a sheet of conductive material. In one form, it is formed by a layer of conductive paint or in another form is made out of conductive plastic.

Figure 2:
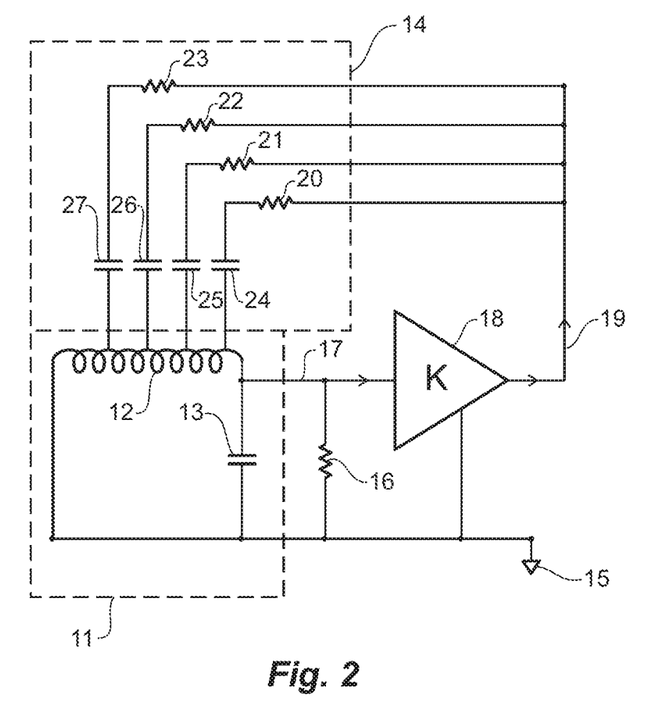
FIG. 2 depicts a circuit for the purpose of aiding understanding of the invention.

FIG. 2 illustrates the distributed capacitive coupling nature of the electrostatic screen to a winding. This circuit shows that the electrostatic screen 14 consists of a distributed lossy capacitance between it and the winding 12 of a receive winding 11 of a metal detector. The lossy distributed capacitance of the electrostatic screen 14 is represented by capacitors 24, 25, 26 and 27, with loss from respective series connected resistors 20, 21, 22 and 23. The equivalent self-capacitance of the winding 12 associated with its fundamental self-resonance is simply shown in this example as a single capacitor 13 rather than a distributed capacitance. The associated fundamental self-resonance capacitance 13 includes any antenna cable connected between the winding 12 and the electronics, and any other associated stray capacitance such as that from an electronics printed circuit board (PCB) and input of receive electronics. The winding 12 is connected to a damping resistor 16, and also to an input 17 of part of the receive electronics, an input 17 of amplifier 18 with gain K. The amplifier 18 in one example has a high input impedance. An output 19 of amplifier 18 is connected back to the electrostatic screen 14. Hence, the system has an "active electrostatic screen" as opposed to the traditional "passive" screens. The system earth is indicated by 15.

Figure 3:
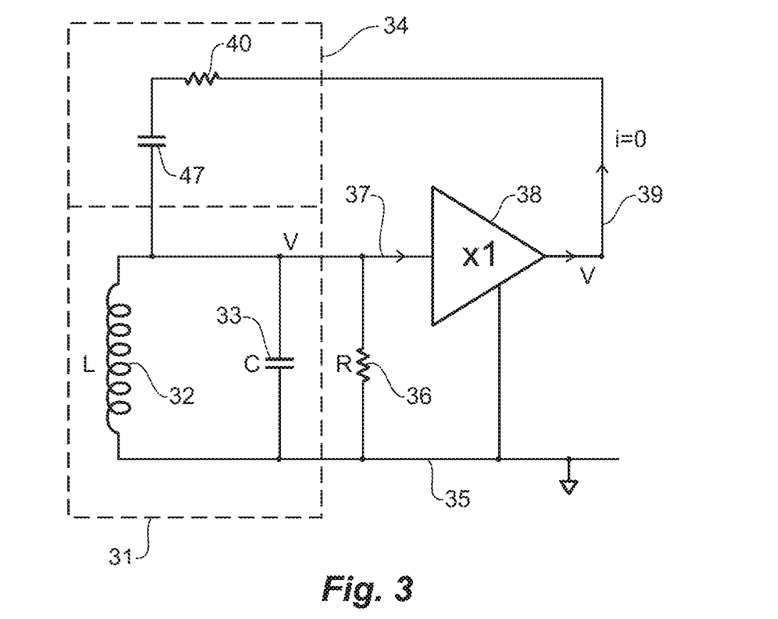
FIG. 3 depicts a simplified circuit of FIG. 2

A simplified version of FIG. 2 is shown in FIG. 3 for the purpose of aiding understanding. For this, the gain of amplifier 38 is set to 1, and the screen capacitance is simplified to an approximate effective single capacitor 47 in series with an effective single resistor 40 instead of the distributed network shown in FIG. 2. The electrostatic screen is thus represented by 34. In FIG. 3, the antenna receive winding inductor 32 with associated self-resonance capacitor 33 (plus coaxial cable and electronics input), is connected to a damping resistor 36, and these are connected to an input 37 of amplifier 38, whose output 39 is connected back to the electrostatic screen 34. The system earth is indicated by 35. One skilled in the art will appreciate that with an amplifier 38 gain of 1, with the assumption of zero phase shift, or relatively small phase shift, the screen 34 will be in effect "invisible" to the receive antenna "self-resonant capacitance" because the voltage across capacitor 47 in series with resistor 40 will be zero, independent of any voltage across the receive winding. Thus, the capacitance, between the antenna receive winding and electrostatic screen, acts as though it is absent. Therefore, the characteristic decay time of a critically damped LCR receive winding will be faster than the traditional arrangement when the electrostatic screen is connected to the system earth wherein it adds to the capacitance of the said antenna receive winding. This advantage not only applies to time-domain, but also to frequency-domain metal detectors because of the reduced receive winding phase shifts resulting from a lower loading capacitance due to an active screen thus described.

This arrangement improves characteristic decay time $\tau = \sqrt{LC}$ to a transient in a receive winding, of the form $$v = ae^{-t/\tau} + b\frac{t}{\tau}e^{-t/\tau}$$

where a and b depend on the initial conditions at the transient of voltage across the winding and current flowing through the inductor, where $$R = 0.5\sqrt{\frac{L}{C}}$$

for a critically damped LCR system; L is the inductance of the receive winding 12 in FIG. 2 and receive winding 32 in FIG. 3; C is the associated self-resonance capacitor plus a capacitance 13 of a coaxial cable to connect the winding to the metal detector's electronics in FIG. 2. This said capacitance is depicted as capacitor 33 in FIG. 3; R is the damping resistor 16 in FIG. 2 and 36 in FIG. 3. The above mathematics only applies to frequencies close to the fundamental resonance or lower, but not higher frequencies.

This embodiment may accentuate the higher-order internal resonances due to the resulting wider receive winding bandwidth in certain windings, which as said above, can be problematic when interrogating magnetic soils. Ideally, these said troublesome higher-order internal resonant ringing signals need be reduced, such as by lowering their associated Q factors. These higher-order internal resonances are mostly manifested in windings with cross-sections of high width-to-height (or vice versa; high height-to-width) ratios, such as mono-layer windings.

Figure 4:
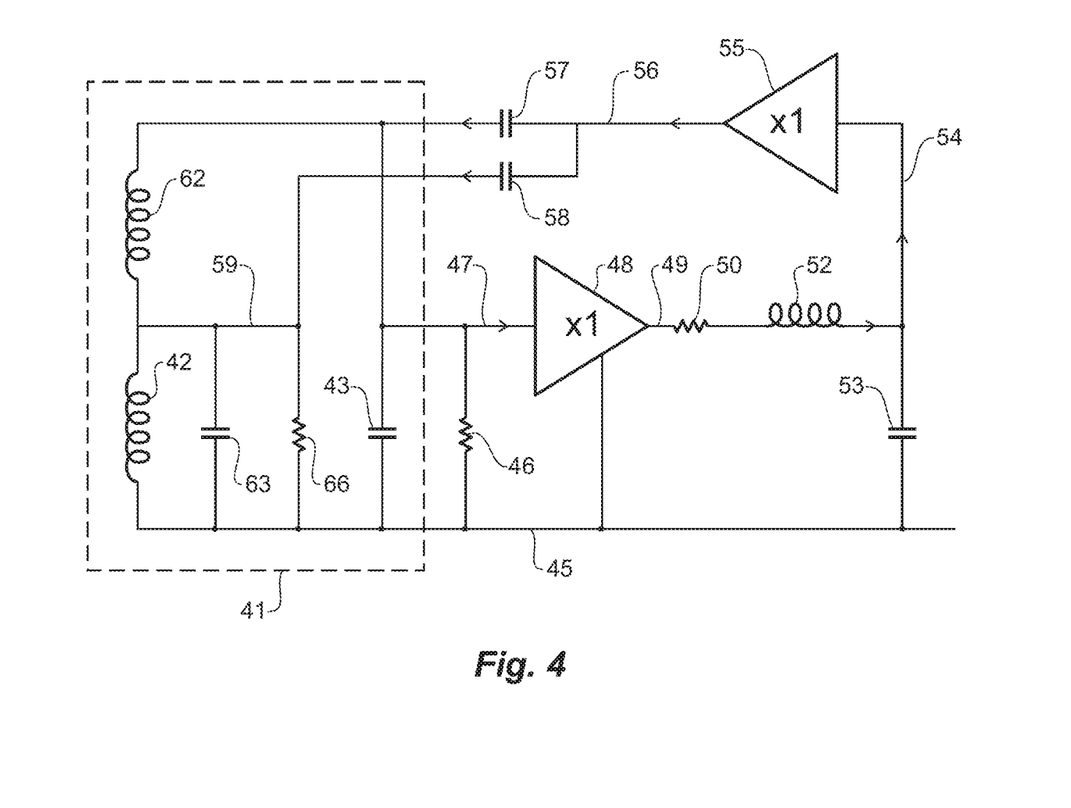
FIG. 4 depicts a simplified basic model to describe the actions of lowering the Q factor of the second order internal resonance, and discloses an exemplary circuit embodiment.

FIG. 4 illustrates an approximate simplified model of the second-order internal resonance of one embodiment to address this issue. The model is by no means particularly accurate, but sufficient for basic understanding of the salient issues. The receive winding 41 is a simple model approximation that includes the fundamental resonance and is sufficient to reasonably well produce the basic effect of the second-order internal resonance. The winding inductance is represented as split between inductor 42 of value H and inductor 62 of value L, and the self-resonance capacitance split between capacitor 43 of value D and capacitor 63 of value C. The capacitance of capacitor 43 is mostly due to the said coaxial cable that is used to connect the winding to the metal detector electronics. Resistor 66 of value R represents a lossy component of the second order internal resonance. The impedance of this network of the antenna receive winding 41 may be calculated using the following:

$$Z = \frac{\omega^2 LH - j\omega R(L + H - \omega^2 LHC)}{\omega^2 R[HC(\omega^2 LD - 1) - (L+H)D] + R + j\omega H(1 - \omega^2 LD)}$$

Note that this does not include the effects of the screen, nor that of the damping resistor 46.

As an example, for values of say L=50 µH, H=240 µH, C=35 pF, D=145 pF, R=10 kΩ, the self-resonance is approximately 700 kHz, and second order internal resonance is approximately 4.35 MHz. Note that the Q factor of the second-order resonance is >>1. Resistor 46 not only acts to critically damp the fundamental "self-resonance" at about 700 kHz, but also reduces the Q-factor of the second-order internal resonance slightly.

In FIG. 4, this network of the receive winding 41 is connected to an input 47 of an amplifier 48 of gain 1 (for illustrative purpose only, and the gain can take other values). An output 49 of amplifier 48 is connected to an "LCR" network consisting of resistor 50 of resistance R', inductor 52 of inductance L', and capacitor 53 of capacitance C', and the node connecting inductor 52 and capacitor 53 is connected to an input 54 of a buffer amplifier 55 (of gain 1 in this example). The network of resistor 50, inductor 52, and capacitor 53 acts as a low-pass filter, and its critically damped transfer function in the frequency domain is $$\frac{1 - (\omega/\Omega)^2 - 2j\omega/\Omega}{(1 - (\omega/\Omega)^2)^2 + (2\omega/\Omega)^2}$$

where the "resonance"

$$\Omega = \frac{1}{\sqrt{L'C'}}.$$

An output 56 of buffer amplifier 55 is connected to the antenna electrostatic screen represented simplistically by a single capacitor 57 (capacitor 58 is not considered here in this simplistic form), and fed back to the receive winding 41. Amplifier 48, the filter consisting of resistor 50, capacitor 53 and inductor 52, and buffer amplifier 55, are part of the "receive electronics". If $$\Omega \gg \frac{1}{\tau},$$

the situation is the same as FIG. 3 at the self-resonance frequency or lower, albeit with a small amount of phase shift through the network of resistor 50, inductor 52 and capacitor 53. Accordingly, the associated capacitance added to the self-resonance capacitor 43 by a passive screen connected to the system earth 45 in the traditional art, is in effect mostly removed herein.

When considering what happens at the second-order resonance (for example, for a monolayer winding), with the second-order internal resonance $\vartheta$ being roughly $$\vartheta \sim \frac{10}{\tau},$$

the feedback signal to the screen is effectively via the high impedance node in the central part of the winding. This is modelled at node 59 in the approximate network model of the antenna receive winding 41. Thus, rather than modelling the screen as capacitor 57, capacitor 58 of value B is a more apt model for the second-order internal resonance. If resistor 46 has a value of P Ohms, then the transfer function between node 56, via capacitor 58, to the input of amplifier 48 (node 47) is $$\frac{RP\omega^2 HB}{RP(1 - \omega^2 LD)[\omega^2 H(B+C) - 1] + \omega^2 H(L + RPD) + j\{R\omega L(\omega^2 HC - 1) + \omega H[R\omega^2 LB - P(1 - \omega^2 LD) - R]\}}$$

At approximately its maximum forward gain at the second order internal resonance, the load impedance presented to capacitor 58 at node 59 is approximately resistive, and hence, at this corresponding frequency, in effect the second-order internal resonant frequency $\vartheta$, the phase shift through capacitor 58 is approximately 90 degrees (j). Assuming that damping resistor 46 has an impedance much larger than that of capacitor 43 at $\vartheta$, and $$\frac{1}{\omega D} < \omega L,$$

then the phase shift between node 59 and node 47 is approximately 180 degrees. Now, if $\Omega \sim \vartheta$, then at $\omega = \Omega$, the phase shift through network resistor 50, inductor 52, and capacitor 53 is 90 degrees lag (−j).

Figure 5:
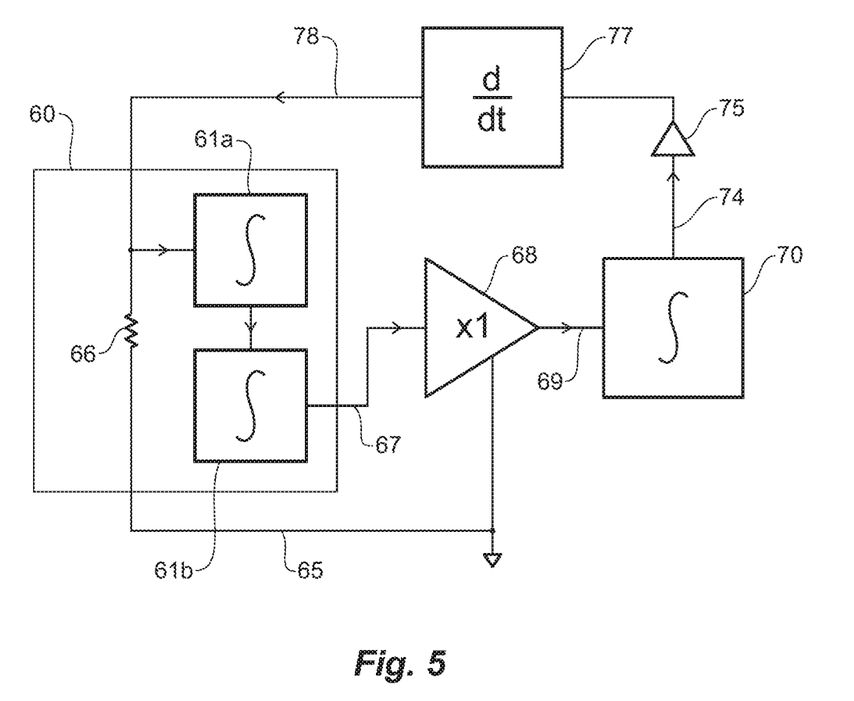
FIG. 5 illustrates one example regardless of magnitudes, the approximate phase shift around the active loop of FIG. 4, to illustrate the effect of an active screen.

FIG. 5 illustrates regardless of magnitudes, the approximate phase shifts around the active screen loop of FIG. 4 at $\Omega=\Omega=\vartheta$. Assume that the amplifier 68 has near zero phase shift. The output 69 of amplifier 68 (equal to the role of amplifier 48 in FIG. 4) is fed to an "integrator" 70 (viz the role of resistor 50, inductor 52, and capacitor 53 in FIG. 4) to produce output at 74 to feed buffer amplifier 75 (also with near zero phase shift). The output of buffer amplifier 75 is fed to a "differentiator" 77 (viz the role of capacitor 58 in FIG. 4), which is presented at node 78 with a resistive load 66 in the model of the receive winding 60 for the second-order internal resonance. Node 78 is fed through two "integrators" 61a, 61b (viz the roles of inductor 62 and capacitor 43 in FIG. 4), thus approximately inverting the sign of a signal at node 78 at $\omega=\Omega=\vartheta$. The output 67 is fed into an input of amplifier 68. System earth is shown as 65. Thus, overall, at $\Omega=\Omega=\vartheta$, the active screen loop acts as a negative feedback loop due to the net inverted sign around the open loop, and this is why the Q factor of the second-order resonance is reduced when this loop is closed. Note that the filter of resistor 50, inductor 52 and capacitor 53 is at least of second-order in order to achieve approximately 90 degrees phase shift through it without excessive attenuation as would be the case for a first-order filter. At frequencies $\omega$ above $\vartheta$, the advantage of selecting a low-pass filter (rather than an all-pass filter with phase shift for example), is that the low-pass filter will not cause significant interaction with yet higher-order internal resonances, nor other possible unwanted higher frequency problems. The second order low pass "LCR" filter consisting of resistor 50, inductor 52 and capacitor 53, may be implemented in various ways, for example; as an active opamp low pass filter, such as for example, the said buffer amplifier 55 acting as a VCVS low pass filter with an equivalent transfer function as that of the "LCR" network (50, 52, 53) and buffer amplifier 55 as drawn in FIG. 4.

Note that the circuits in the figures above may be implemented digitally using Analogue-Digital and Digital-Analogue convertors and processing, indeed, with additional advantages. For example, an algorithm could determine the frequency of internal resonant ringing and adjust the said forward transfer function, in either values and/or form, to optimise, that is minimise, internal resonant winding ringing Q factor and/or decay of the fundamental transient decay (such as t described above).

Figure 6:
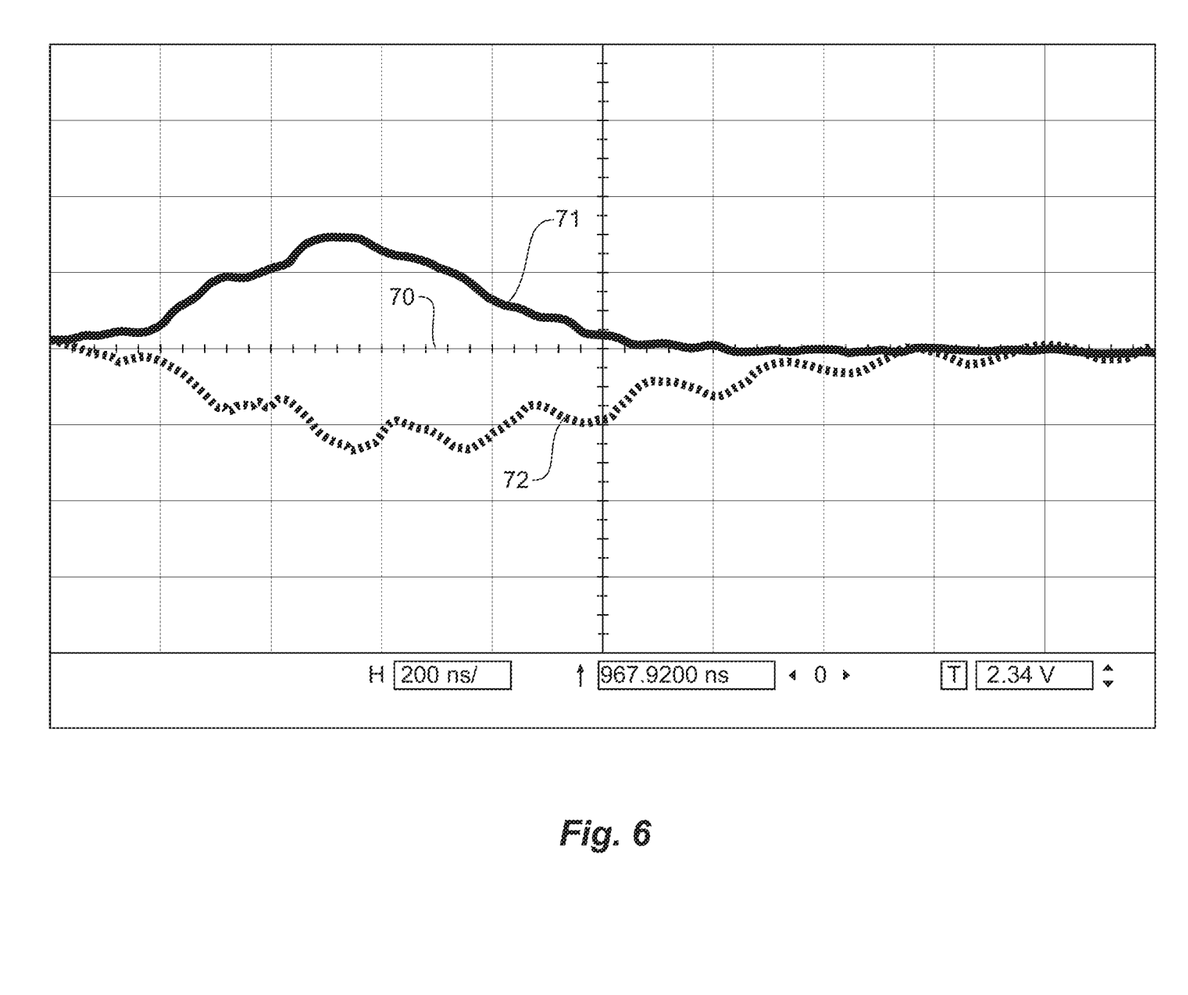
FIG. 6 shows a sketch of an observed oscilloscope trace for an active electrostatic screen system such as that of FIG. 4.

FIG. 6 shows a sketch of an observed oscilloscope trace for an active electrostatic screen system similar to that of FIG. 4, compared to when the screen is connected traditionally to a system earth. This is for when a 50 Ohm source square-wave is fed via the damping resistor to a monolayer winding, and adjusted for critical damping in both cases, and the trace shows the difference in signal following a square-wave transition for each said case between the antenna winding being unloaded, and the winding being loaded with magnetic permeability to simulate an antenna interrogating air as opposed to a magnetic soil (ignoring viscous remnant magnetic permeability). As can be seen, the spurious signal 71 from the active screen setup decays to zero substantially faster than for the conventional screen setup 72, with the Q of the internal resonance at a little over 4 MHz being very substantially reduced. The traces are drawn in opposite polarity purely for reasons of visual convenience. The zero voltage is shown as 70. The total x-axis shown in the figure is 2 microseconds. Note that the ringing and decay of the active electrostatic screen has died down to close to zero by 1.4 microseconds, whereas the ringing of the earthed screen setup clearly continues for some time past 2 microseconds, and the decay trend ignoring the ringing (that of the fundamental decay) is significantly faster for the active screen compared to the passive screen.

Note that this feedback loop may be used just to damp down the second (or higher) order internal ringing, by applying other passive elements rather than a screen (such as a capacitor) between an output of a receive winding amplifier and the mid-point of a receive winding. Further, the same concepts could be applied to a transmit winding to likewise reduce transmit winding internal resonant ringing. The same could extend to the third-order internal resonances wherein the taps on the winding would be at about ¼ and ¾ way through the windings, but their feedback signs would be opposite respectively.

Figure 7A:
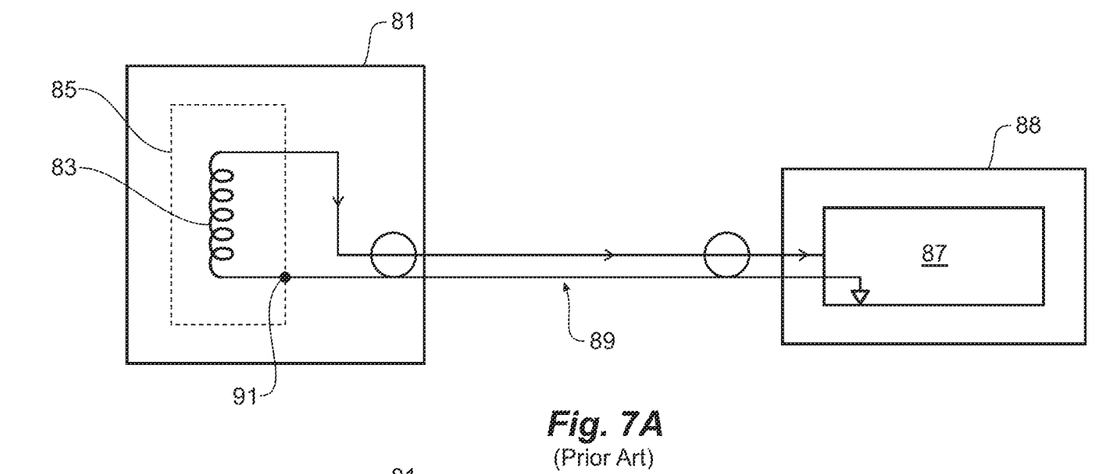
FIGS. 7A and 7B depict examples comparing the connections of an antenna with an earthed electrostatic screen with the connections of an antenna with an active electrostatic screen based on one embodiment of the present disclosure.
Figure 7B:
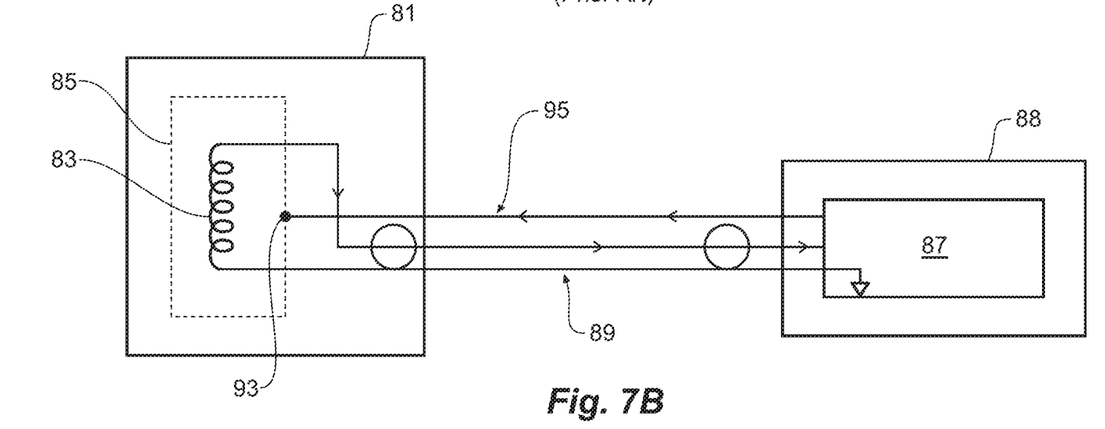

FIGS. 7A and 7B depict examples comparing the connections of an existing antenna with an electrostatic screen with the connections of an antenna with an electrostatic screen based on the one embodiment of the present disclosure. In particular, for a prior art arrangement in FIG. 7A, an antenna 81 is connected to receive electronics 87 in a control box 88 through a cable 89. Cable 89 may be a coaxial cable. Within the antenna 81, there are windings 83 surrounded by an electrostatic screen 85. The screen 85 is connected to earth at 91. For an embodiment based on the one embodiment of the present disclosure in FIG. 7B, the electrostatic screen 85 is connected at 93 to a cable 95 to receive a signal from the electronics 87. A cable including both the coaxial cable 89 and active screen cable 95 between the antenna 81 and electronics 87 may be a multi-core cable, and may include a coaxial cable 89.

Figure 8:
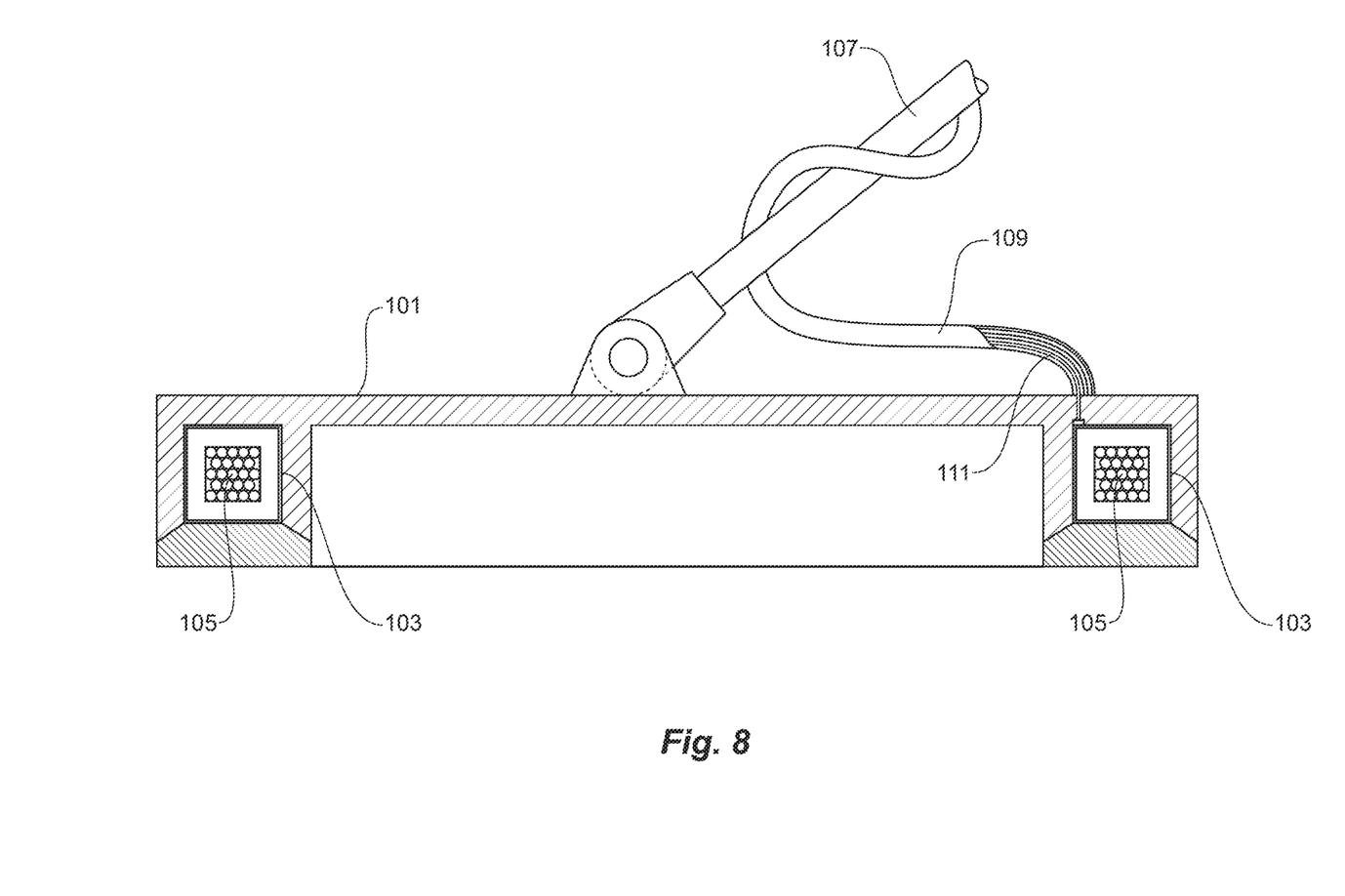
FIG. 8 depicts an exemplary implementation of an electrostatic screen in a sensor head of a metal detector.

FIG. 8 depicts an exemplary implementation of an electrostatic screen in a coil of a metal detector. In this exemplary implementation, a shaft 107 is supporting a coil 101 of a handheld metal detector. A cross-section of the coil 101 is shown, showing cross sections of winding 105 and an electrostatic screen 103. The electrostatic screen 103 surrounds the cross-section of the winding 105 in this embodiment, and that electrostatic screen 103 covers most of the winding 105 when viewed from the top (not shown). In other embodiments, the electrostatic screen 103 only surrounds part of the cross section of the winding 105. In other embodiments, the electrostatic screen 103 only covers part of the winding 105 when viewed from the bottom (i.e. quarter, half, three-quarter etc.). The electrostatic screen 103 is connected to an electronic circuit through cable 111 within a larger cable 109 which further comprises cable connecting the winding 105 to the receive electronics. In this example, the electrostatic screen 103 takes the form a physical sheet. In other forms, the screen 103 can be created by spraying special paint onto parts of the coil housing surrounding the winding 105 to create a conductive layer or the coil 101 may be made out of conductive plastic. The conductive layer is then connected to an electronic circuit to act as the electrostatic screen 103. The gap between the winding 105 and electrostatic screen 103 can be an air gap, or it may be filled with foam or other similar materials. In other embodiments, there is more than one winding in the coil.

Figure 9:
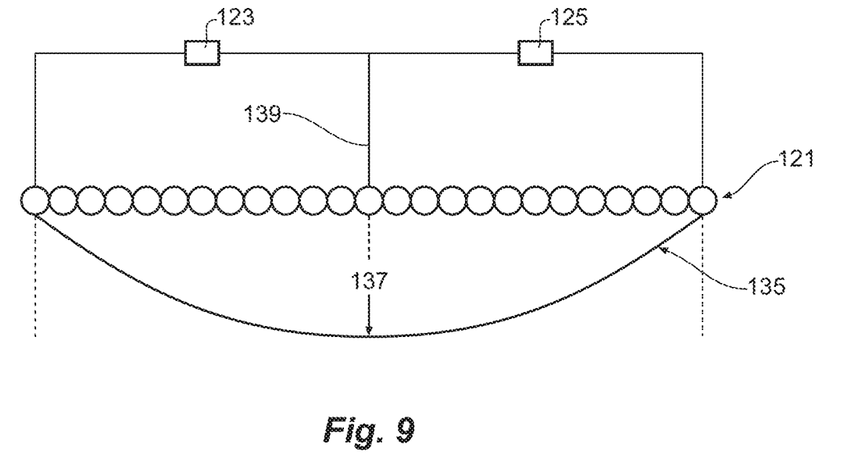
FIGS. 9 and 10 depict a cross-section of a winding configuration to reduce second and third-order internal ringing, with or without an electrostatic screen.
Figure 10:
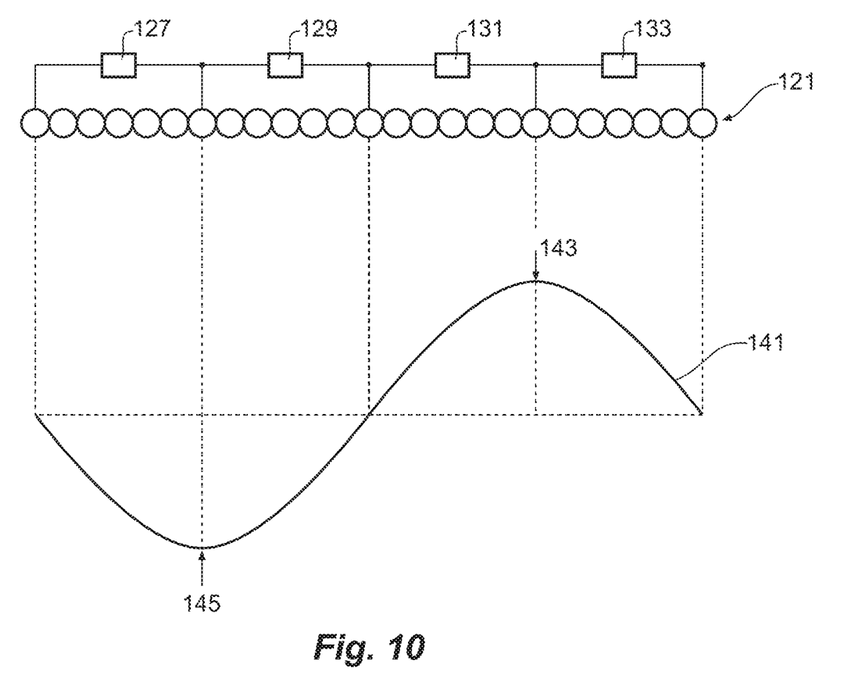

FIGS. 9 and 10 depict examples of a cross-section of a winding configuration to reduce second and third-order internal ringing, with or without a screen. A winding 121 of an antenna comprising multi-turns is shown. Each circle represents a wire within the cross-section of the winding 121. The wires are wound in a same plane of the illustrated cross-section, and the innermost and outermost portions define two ends. In one form, a passive network with at least a resistive component 123 connects one end of the winding 121 (in this case the wire at the left most) to a centre or near centre wire 139. In another form, a passive network with at least a resistive component 125 connects another end of the winding 121 (in this case the wire at the right most) to a centre or near centre wire 139. In terms of the model of FIG. 4, this can be modelled by reducing resistor 66 and that may also add additional reactive components. Alternatively, passive networks with at least resistive components 127, 129, 131, and 133 are used to connect different parts of the winding 121. Graph 135 shows internal resonance voltage of the second-order with 137 indicating the maximum voltage at or near the centre of the winding 121 while graph 141 shows internal resonance voltage of the third-order with 143, 145 indicating the maximum voltage points at or near the quarter and three-quarter point of the winding 121. The third-order internal resonance may be passively damped, for example, by connecting a passive network with at least a resistive component 127 to one end of the winding 121 and a tap at about one quarter way along the winding 121, and another a passive network with at least a resistive component 133 to the other one end of the winding 121 and a tap at about three quarters way along the winding 121. Both the second and the third-order internal resonances may be passively damped for example, by connecting passive networks with at least resistive components 127 and 133 as described above, and also a passive network with at least a resistive component 129 to a tap about one quarter way along the winding 121 to a tap about half way along the winding 121, and a passive network with at least a resistive component 131 to a tap about half way along the winding 121 to a tap about three quarters way along the winding 121. The said passive networks with at least a resistive component, may include a resistor in series with a capacitor for example.

Those of skill in the art would understand that information and signals may be represented using any of a variety of technologies and techniques. For example, data, instructions, commands, information, signals, bits, symbols, and chips referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A metal detector for detecting a target, the metal detector comprising:
    a transmitter for transmitting a transmitted magnetic field;
    a receiver, comprising a winding with a plurality of turns, for receiving a magnetic field; and
    a receive electronics connected to the winding for receiving signals from the winding;
    wherein the receiver further comprises an electrostatic screen covering at least part of the winding, wherein the electrostatic screen is not directly connected to a ground;
    wherein the electrostatic screen is connected to an electronic circuit to receive signals from the receiver through the electronic circuit to reduce an effective capacitance presented by the electrostatic screen to the winding; and
    wherein the signals from the electronic circuit to the electrostatic screen are dependent on the receiving signals from the winding.

2. The metal detector of claim 1, wherein the electronic circuit is connected to the receive electronics.

3. The metal detector of claim 1, wherein the electronic circuit introduces a phase shift to the signals from the winding and sends the phase-shifted signals to the electrostatic screen.

4. The metal detector of claim 1, wherein the electronic circuit comprises a filter which has a phase shift of between 60 to 120 degrees at a second-order internal resonance frequency of the winding.

5. The metal detector of claim 1, wherein the electronic circuit comprises a filter, the filter comprises a low-pass filter of a second-order transfer function, or higher-order transfer function, with a cut-off frequency within at least 40% of a second-order internal resonance frequency of the winding.

6. The metal detector of claim 4, wherein a Q factor of the second-order transfer function is between 1 and 2.

7. The metal detector of claim 1, wherein the receive electronics is connected to a first tap of the winding in addition to being connected to both ends of the winding.

8. The metal detector of claim 7, wherein the first tap is at a mid-point of the winding.

9. The metal detector of claim 1, wherein the receive electronics reduces a Q factor of the second-order internal resonance of the winding.

10. The metal detector of claim 1, wherein the receive electronics reduces a decay time of a transmitted signal within the winding.

11. The metal detector of claim 1, wherein the transmitter and the receiver are the same single winding or windings.

12. The metal detector of claim 1, wherein the electronic circuit is implemented digitally.

13. An antenna for a metal detector, including:
at least a winding, the winding comprises a plurality of turns connected to receive electronics of the metal detector; and
an electrostatic screen covering at least part of the winding;
wherein the electrostatic screen is connected to an electronic circuit of the metal detector to receive a signal from the antenna through the electronic circuit to reduce an effective capacitance presented by the electrostatic screen to the winding, wherein the electrostatic screen is not directly connected to a grounds; and
wherein the signals from the electronic circuit to the electrostatic screen are dependent on the receiving signals from the winding.

14. The antenna of claim 13, wherein the electronic circuit is connected to the receive electronics of the metal detector.

* * * * *

UNITED STATES PATENT AND TRADEMARK OFFICE
CERTIFICATE OF CORRECTION

| | |
|---|---|
| PATENT NO. | : 11,454,736 B2 |
| APPLICATION NO. | : 17/012278 |
| DATED | : September 27, 2022 |
| INVENTOR(S) | : Bruce Halcro Candy |

It is certified that error appears in the above-identified patent and that said Letters Patent is hereby corrected as shown below:

In the Claims

Column 14, Line 14, Claim 13, delete "grounds;" and insert -- ground; --

Signed and Sealed this
Twenty-second Day of November, 2022

*Katherine Kelly Vidal*

Katherine Kelly Vidal
*Director of the United States Patent and Trademark Office*